(12) United States Patent
Brelati et al.

(10) Patent No.: US 10,823,708 B2
(45) Date of Patent: Nov. 3, 2020

(54) GRAPHENE-BASED NON-DESTRUCTIVE INSPECTION DEVICE AND RELATED METHOD

(71) Applicant: LEONARDO S.p.A., Rome (IT)

(72) Inventors: Antonio Brelati, Nocera Inferiore (IT); Rosario Del Giudice, Naples (IT); Tommaso Romano, Rome (IT)

(73) Assignee: LEONARDO S.P.A., Rome (IT)

( * ) Notice: Subject to any disclaimer, the term of this patent is extended or adjusted under 35 U.S.C. 154(b) by 236 days.

(21) Appl. No.: 15/972,982

(22) Filed: May 7, 2018

(65) Prior Publication Data
US 2018/0328895 A1 Nov. 15, 2018

(30) Foreign Application Priority Data
May 9, 2017 (IT) .................. 102017000050174

(51) Int. Cl.
*G01N 29/24* (2006.01)
*G01N 29/04* (2006.01)
(Continued)

(52) U.S. Cl.
CPC ........... *G01N 29/2431* (2013.01); *B64F 5/60* (2017.01); *G01N 29/043* (2013.01); *G01N 29/07* (2013.01); *G01N 29/2475* (2013.01); *B63B 5/24* (2013.01); *B64C 2001/0072* (2013.01); *B64D 2045/0085* (2013.01); *G01N 2291/0231* (2013.01); *G01N 2291/0258* (2013.01);
(Continued)

(58) Field of Classification Search
CPC .. G01N 29/2431; G01N 29/043; G01N 29/07; G01N 29/2475; G01N 29/14; G01N 29/04
See application file for complete search history.

(56) References Cited

U.S. PATENT DOCUMENTS

| 10,509,013 B2* | 12/2019 | Gerardo | ............. G01N 29/2406 |
| 2018/0130457 A1* | 5/2018 | Hakkens | ............... A61B 8/4227 |
| 2018/0209943 A1* | 7/2018 | Safai | ...................... G01N 29/24 |

FOREIGN PATENT DOCUMENTS

| DE | 10 2010 000391 | 8/2011 |
| DE | 10 2014 101287 | 8/2015 |
| KR | 101 699 796 | 1/2017 |

OTHER PUBLICATIONS

English Translation of DE102014101287.*
(Continued)

*Primary Examiner* — Helen C Kwok
(74) *Attorney, Agent, or Firm* — Leason Ellis LLP (57) ABSTRACT

Non-destructive inspection device, comprising: a first structural layer; a second structural layer coupled to the first structural layer; a chamber sealed between the first and second structural layers, containing a gas; and an active region, housed in the chamber, of a Graphene-based material. In a first operating condition, an AC electric current is fed to the active region and generates by thermoacoustic effect a first acoustic wave propagating away from the chamber. In a second operating condition, a second acoustic wave, generated by a reflection of the first acoustic wave, is received at the chamber and causes a variation in pressure and, consequently, a variation in the temperature of the gas contained in the chamber generating, by means of the thermoelectric effect, an electrical signal in the active region.

25 Claims, 5 Drawing Sheets

(51) Int. Cl.
    *G01N 29/07*     (2006.01)
    *B64F 5/60*     (2017.01)
    *B64D 45/00*     (2006.01)
    *B63B 5/24*     (2006.01)
    *B64C 1/00*     (2006.01)

(52) U.S. Cl.
    CPC ............ *G01N 2291/0289* (2013.01); *G01N 2291/0421* (2013.01); *G01N 2291/101* (2013.01); *G01N 2291/2638* (2013.01); *G01N 2291/2694* (2013.01)

(56) References Cited

OTHER PUBLICATIONS

Lin Xiao et al: "Flexible, Stretchable, Transparent Carbon Nanotube Thin Film Loudspeakers", Nano Letters, American Chemical Society, us, vol. 8, No. 12, Oct. 29, 2008 (Oct. 29, 2008), pp. 4539-4545, XP002534917, ISSN: 1530-6984, DOI: 10.1021/NL802750Z [retrieved on Oct. 29, 2008] * p. 4542-p. 4543; figure 5b *.
Seth S Kessler et al: "Packaging of Structural Health Monitoring Components", Visual Communications and Image Processing; Jan. 20, 2004-Jan. 20, 2004; San Jose, vol. 5391, Jan. 20, 2004 (Jan. 20, 2004), pp. 219-229, XP009147986, DOI: 10.1117/12.538843 ISBN: 978-1-62841-730-2 [retrieved on Nov. 23, 2004] * the whole document *.

\* cited by examiner

GRAPHENE-BASED NON-DESTRUCTIVE INSPECTION DEVICE AND RELATED METHOD

PRIORITY CLAIM

This application claims priority from Italian Patent Application No. 102017000050174 filed on May 9, 2017, the disclosure of which is incorporated by reference.

TECHNICAL FIELD

The present invention relates to a non-destructive, graphene-based inspection device and to a related manufacturing method. In particular, the non-destructive inspection device is based on the thermoacoustic emission generated by an integrated device including Graphene. Even more particularly, the thermoacoustic emission device is integrated into the structure or substrate to be analysed.

BACKGROUND OF THE INVENTION

Non-destructive tests "NDT—or "non-destructive inspections" NDI) are known in the prior art, for detecting structural defects such as delamination, inclusions, porosity, and contaminations in an analysed structure. The purpose of non-destructive testing is therefore to inspect, qualify and/or evaluate the quality of a structure without generating defects or any other change in said structure with respect to the design requirements. NDT methods range from simple visual inspection to more complex techniques, such as ultrasound inspection, and are used in a variety of industrial fields (aeronautics, naval, automotive, energy, and the medical field).

NDT ultrasound methods guarantee high quality and reliable controls, both for sub-components of an aeronautic system and for the aeronautic system as a whole. It is in fact possible to detect small size defects in many materials, such as metal, non-metal, magnetic or non-magnetic materials, composites.

In ultrasonic inspections, high frequency vibrational elastic waves (well beyond the audible threshold) are introduced into the object to be examined in order to highlight internal defects, measure their thickness or evaluate their mechanical characteristics. Waves are usually produced by probes (commonly piezoelectric or piezoceramic), but they can also be generated by other mechanisms, for example by laser excitation of the surface to be investigated, which, at this point, generates the elastic waves itself. In particular, for the analysis of carboresins, typically longitudinal waves are used with frequencies between 0.5 and 25 MHz (however, for certain applications, 200 MHz may be exceeded). The ultrasound beam generated, characterized by a propagation law in time and space (which also determines a specific geometric shape) is sent to the structure to be examined using a suitable coupling medium (such as water or gel, which leaves the beam substantially unperturbed) to minimize the reflected component compared to that transmitted in the medium. Generally, the ultrasound inspection of a structure is performed with the aid of a scanning system (which for flat structures has two axes), which substantially describes a mesh, the denser the mesh the smaller the scanning step in each direction: an inspection event is performed in each node of the mesh.

With the decreasing cost of materials for the most commonly used types of fibres and resins, composite materials (in particular those in carboresin, including carbon fibres impregnated with epoxy resins) are used on a wide scale for the construction of parts of means of transport, especially in the aerospace field. In this context, their use is fundamentally linked to the need to reduce the weight of aircraft in order to reduce fuel consumption and increase the payload; this without affecting, or actually improving, the mechanical characteristics of the aircraft itself. Other advantageous features are related to the good thermal insulation, the elimination of corrosion phenomena and the simplification (with consequent reduction of costs) of maintenance programmes.

The carboresin structures may be laminated (superimposed layers of pre-impregnated materials) or "sandwich" type (i.e., a low weight material interposed between two laminates in carboresin, kevlar, fibreglass and/or honeycomb structure metal skins). They may present manufacturing defects, understood as any deviation from the project requisites. These defects, if not revealed and eliminated, may evolve during the working life of the structures that comprise them, jeopardising their performance. Some defects cannot be repaired, in which case the manufactured structure must be rejected.

Some defects are superficial or however detectable by visual investigation. Others, however, are internal to the structure, so their detection and measurement requires more complex instrumental non-destructive methods, usually ultrasonic. The most common internal defects in laminated structures are delamination, inclusions, porosity, voids and deformations of the pre-impregnated layers, generally indicated, as internal wrinkles. Such defects are usually readily detectable by conventional ultrasound techniques applied during the quality control steps, or even in service, for defects caused by accidental damage during the operating life of the structure (for example, a delamination produced by an impact).

The known ultrasonic inspection techniques, although able to detect most of the defects, such as porosity, delamination, etc., are not able to provide an accurate characterization of some types of defects, or are even unable to detect them. This happens especially if the inspection is carried out for irregularly shaped, very thin or non-homogeneous materials. Furthermore, ultrasonic inspection techniques require the operator performing the inspection to be highly qualified, in order to properly calibrate the inspection equipment and correctly interpret the data collected.

Further limits of the prior art regard geometric constraints which can make the couplings between surfaces and probes complex, especially for service and maintenance checks, due to the customization of the instruments which must be adapted to the geometries of the parts to be inspected; source/surface coupling problems (use of water to reduce the surface reflection of the transmitted wave); and complexity and dimensions of the test instrumentation (only available in the laboratory). Moreover, it is to be noted that the devices of the prior art for non-destructive tests can be used outside the structure to be analysed, without any possibility of integration. Such devices require an operator to slide the probe above the surface of the material under inspection, at a certain speed and in a given direction and require the test to be performed in a laboratory environment (they can not be performed at any time during the manufacturing process), with an execution time which depends on the vastness of the surface to be inspected. For these reasons, the design of the instrumentation and for the inspections to be carried out both during manufacturing and the life cycle of the materials entail high costs.

The patent document DE102014101287 relates to an apparatus for generating short-duration, high sound pressure ultrasound pulses as well as an electro-thermo-acoustic transducer, utilisable for NDT applications. However, this document does not mention the use of reduced graphene oxide, does not describe its use in the field of non-destructive testing and does not illustrate a manufacturing method of a non-destructive test device based on reduced graphene oxide. The use of Graphene, merely mentioned, is not discussed in detail and no detailed information is provided for its integration into a probe for non-destructive inspection.

The document of Lin Xiao et al., "Flexible, Stretchable, Transparent Carbon Nanotube Thin Film Loudspeakers", Nano Letters, 2008, Vol. 8, No. 12, illustrates the emission of audible sound by thin films of carbon nanotube fed by electric currents at sound frequencies. This document is not related to non-destructive tests, nor to the use of graphene or reduced or partially reduced graphene oxide in the context of non-destructive tests.

The patent document KR101699796 concerns a two-dimensional thermoacoustic loudspeaker that uses 3D graphene and its manufacturing method, and more in particular a two-dimensional thermoacoustic diffuser that uses three-dimensional graphene with an improved sound pressure level. The two-dimensional thermoacoustic loudspeaker comprises: a part generating acoustic waves formed of three-dimensional graphene created by reducing a graphene oxide; a first electrode attached on one side of the part generating acoustic waves; and a second electrode connected to the other side of the part generating acoustic waves. This document is not related to non-destructive tests, nor to the use of graphene or reduced or partially reduced graphene oxide in the context of non-destructive tests.

The document of Seth S. Kessler et al., "Packaging of Structural Heralth Monitoring Components", Smart Structures and Materials 2004: Sensors and Smart Structures Technologies for Civil, Mechanical and Aerospace Systems, Shih-Chi Liu Editor, Proc. Of SPIE, Vol. 5391, illustrates design and testing phases of piezoceramic actuators and sensors for SHM devices.

In general, only some of the aforementioned documents of the prior art provide indications on the behaviour of carbon nanotubes or carbon nanoribbon, and in any case always and only at the microscopic level, not providing indications on the scalability of the results obtained. In fact, the geometric dimensions, the times of the processes (reduction, oxidation, etc.) and the range of values of the physical quantities are not adequately discussed. In particular, these documents do not permit the manufacture of a device for detecting defects for the non-destructive analysis of structures made of composite material, as already mentioned.

SUMMARY OF THE INVENTION

The purpose of the present invention to provide a non-destructive inspection device based on acoustic waves and a related manufacturing method such as to overcome the drawbacks of the prior art. Moreover, the invention according to the present invention makes it possible to perform automatic tests with high performance at low cost.

According to the present invention, a non-destructive inspection device based on acoustic waves and a relative manufacturing method are realised, as defined in the attached claims.

BRIEF DESCRIPTION OF THE DRAWINGS

For a better understanding of the present invention, preferred embodiments are described below, purely by way of non-limiting examples, with reference to the attached drawings, in particular:

FIGS. 3A-3D illustrate, using a common time scale, signals transmitted and received by the inspection device of FIG. 2A, in which, in particular, FIG. 3A is representative of a transmitted signal.

DETAILED DESCRIPTION OF THE INVENTION

According to the present invention, a non-destructive inspection device is provided (shown in its entirety in FIG. 2A with the reference number 30) the operating principle of which is based on the thermo-acoustic effect.

In general, thermoacoustics studies the exchanges of energy in the presence of sound and is based on acoustic and thermodynamic principles. An acoustic wave carries mechanical energy (pressure gradient) and comprises a kinetic component (caused by the oscillatory motion of the propagation medium, for example a gas such as air) and a potential component (caused by local condensation of the propagation medium). Considered a gas for which the known equation PV=nRT is valid (where P is the pressure, V is the volume, n is the quantity of substance, R is the characteristic constant of the type of gas and T is the temperature) inducing a temperature gradient T according to a given function (e.g. sinusoidal law) in the adiabatic system condition, this induces a pressure variation P which will generate a corresponding acoustic wave. The effect is dual in the sense that, starting from an acoustic wave, a temperature gradient can be induced in a gas according to a given function (e.g. sinusoidal law).

Air (or a noble gas) heats up during condensation and cools down during a rarefaction. In the first case we talk about "thermoacoustic engines" systems that transform a flow of heat between a hot and a cold body into mechanical energy in the form of a sound wave. In the second case we speak of "refrigeration" systems that transform the mechanical energy of the sound wave to obtain a flow of heat from a cold to a warm body.

Thermoacoustic technology has numerous advantages, in particular it does not require moving parts (it is therefore free of problems of wear and friction), it is reliable, it exploits low-cost materials and production technologies, and is modular in the sense that it is possible to modulate the acoustic power emitted by acting on the amplitude of the oscillation of the electric excitation signal.

The non-destructive inspection device 30 according to the present invention can be integrated into a structural element of a means of transport, in particular parts of an aircraft made of composite material. In one embodiment, the non-destructive inspection device 30 comprises a transducer element, facing a chamber containing gas (e.g., air), which can be polarized to generate, in use, heat by the Joule effect. By thermoacoustic effect, as previously discussed, the temperature variation of the transducer element induces a variation of pressure in the chamber which the transducer element faces towards and, consequently, the generation of an acoustic wave.

In one embodiment, the transducer element includes a conductive layer of Graphene (ideally, pure Graphene), or partially reduced Graphene oxide (prGO). The conductive layer has a value of HCPUA "Heat Capacity per Unit Area") chosen of an extremely low value, ideally close to that of a pure Graphene monolayer. The value $C_s$ of HCPUA of a Graphene monolayer ($C_s$=dρ$C_p$, where d is the thickness, ρ is the density, and $C_p$ is the specific temperature) is about $5.8 \cdot 10^{-4}$ J m$^{-2}$ K$^{-1}$ (with d=0.335 nm, ρ≈2200 kg m$^{-3}$, $C_p$≈790 kJ kg$^{-1}$ K$^{-1}$). The power produced by a thermoacoustic transducer depends on the incoming electrical power and is inversely proportional to the HCPUA value of the material used. Compared to platinum (with a HCPUA equal to about 2 J m$^{-2}$ K$^{-1}$), Graphene has a HCPUA value four orders of magnitude lower, thus ensuring a high gain of the device according to the present invention.

For the purposes of the present invention, the reduced graphene oxide conductive layer of the transducer element is designed to have a HCPUA value which falls within the range of values between $10^{-1}$ and $10^{-2}$ J m$^{-2}$ K$^{-1}$.

The term "reduced graphene oxide", also known as "rGO", means a layer of Graphene oxide (which in itself is an insulator and has a resistivity of at least $10^{12}$ Ωm) which has been subjected to a reduction process with the aim of performing a removal of functional groups, such as hydroxyl (—OH), carboxyl (—COOH) and carbonyl (CO), which give it its high impedance. The reduction of the graphene oxide, or the removal of oxygen atoms from the structure, can be carried out by using reducing agents (hydrazine, dimethylhydrazine, hydroquinone, NaBH4), thermal methods and treatments with UV rays in the presence of $TiO_2$. Pure Graphene (G) and Graphene Oxide (GO) have complementary physical and electrical properties, the former being an excellent electrical conductor (resistivity ρ≈$10^{-8}$ Ωm) while the second is a perfect insulator (resistivity ρ≥$10^{12}$ Ωm).

The reduction process of Graphene oxide makes it possible to obtain a hybrid material (reduced Graphene oxide) with properties that can be modulated by varying the concentration of Oxygen, to obtain controlled intermediate characteristics, i.e. its resistivity can be regulated. A reduced Graphene oxide layer can therefore have a resistivity which is controlled as a function of the duration of the reduction process, reaching resistivity values of metallic conductive materials, or even lower.

As a result, according to the present description, the term "partially reduced graphene oxide", also known as "prGO", means a layer of Graphene oxide which, after the reduction process, has a resistivity lower than $10^{12}$ Ωm and greater than $10^{-8}$ Ωm, for example between $10^{-7}$ Ωm and $10^{-2}$ Ωm.

Figure 1:
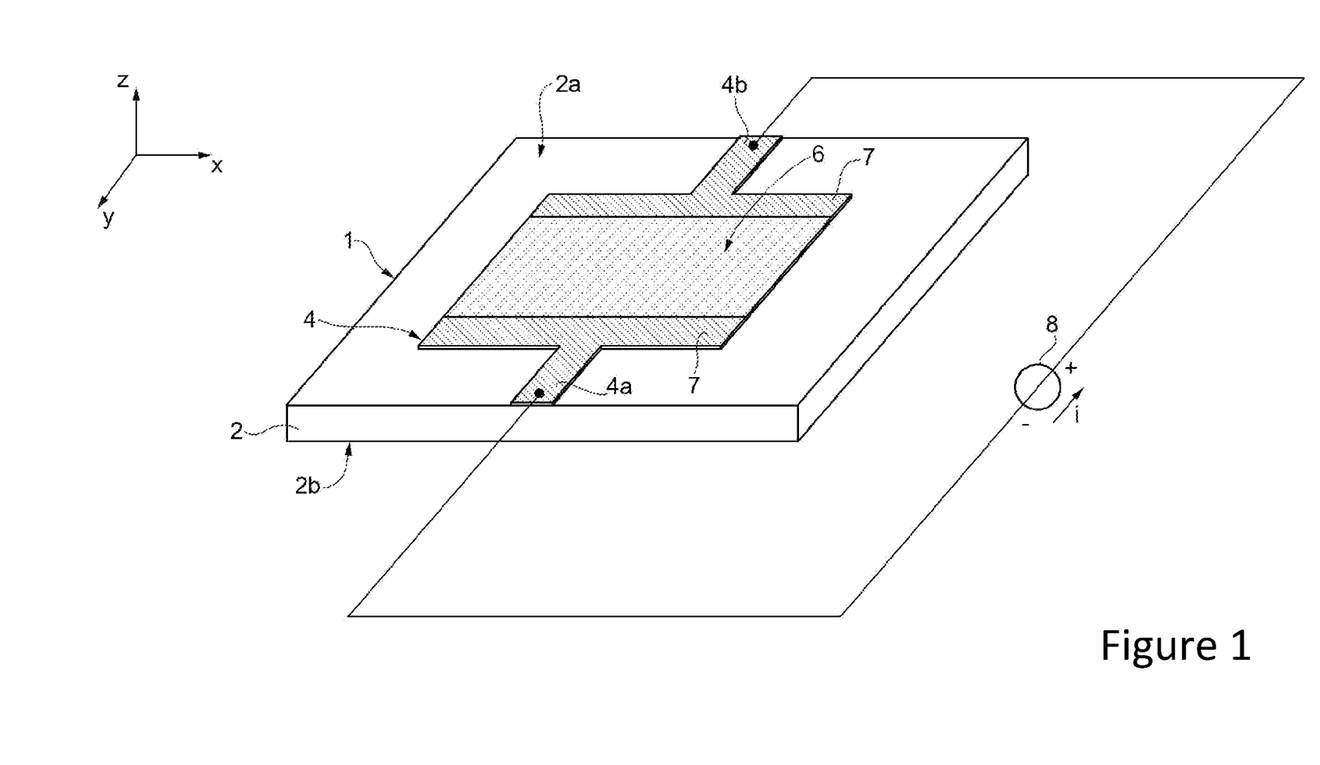
FIG. 1 illustrates a portion of a non-destructive inspection device according to one aspect of the present invention.

FIG. 1 illustrates, in a triaxial system X, Y, Z and with the reference numeral 1, a portion of a component or structural element (hereinafter also identified with the term "structure") of an aircraft (not illustrated in its entirety), for example a wing or fuselage portion of the aircraft. The structural portion 1 includes a first structural layer 2 of composite material, in particular of laminar composite material, even more particularly of carbon fibre having a resin matrix which keeps the carbon fibres in place and lends shape to the composite article (pre-impregnated).

The first structural layer 2 has a first surface 2a and a second surface 2b) opposite each other along the axis Z. On, or at least partially integrated in, the first surface 2a a transducer element 4 extends, including an active layer region 6 of reduced Graphene Oxide having a HCPUA value which tends to the ideal value of a pure Graphene monolayer (in practice, with the currently available technologies, a value of HCPUA between $10^{-1}$ and $10^{-2}$ J m$^{-2}$ K$^{-1}$), and electrical contact regions 7, of reduced graphene oxide, electrically coupled to the active layer region 6. The resistivity value of the electrical contact regions 7 is chosen, for example, in the order of copper resistivity value.

The resistivity value of the active layer region 6 is lower than that of the electrical contact regions 7 and is obtained by carrying out a reduction process of the Graphene oxide for a longer time than that foreseen for the formation of the electrical contact regions 7.

The heat generated by feeding the electric current i to the active layer region 6 through the electrical contact regions 7, heats the gas in contact with the active layer region 6, generating a temperature gradient in the gas and, by thermoacoustic effect, sound waves propagating in a direction orthogonal to the first surface 2a (i.e. in the Z direction).

The transducer element 4 can be functionally coupled, by means of conductive strips 4a, 4b connected to the electrical contact regions 7, to conduction terminals of a voltage generator 8 configured to generate a potential difference ΔV between the electrical contact regions 7 so as to cause, in use, the flow of an electric current i through the transducer element 4. The value of the voltage generated by the generator 8, as well as the current values i, depend on various factors, including the thickness of the active layer region 6, the resistivity value of the active layer region 6 and the thickness of the structure under inspection. The generator 8 can be made integrated in the structural portion 1 and be part of the device 30 according to the present invention, or it can be an element external to the device according to the present invention.

In an exemplary embodiment, the active layer region 6 has a thickness along Z, for example between 50 μm and 150 μm, and shape, on the XY plane, quadrangular, for example square. The size of the area (on the XY plane) of the active layer region 6 is chosen according to the specific application. Possible values for the area (on the XY plane) of the active layer region 6 are in the 1 cm$^2$ to 100 cm$^2$ range for aerospace applications.

According to an aspect of the present invention, the transducer element 4 is formed of a thin, Graphene (prGO)-based layer wherein, in one embodiment, the electrical contact regions 7 are made of partially reduced Graphene oxide (prGO) having resistivity of the same order of magnitude as that of the active layer region 6. The reduction process of the Graphene oxide layer, per se known, can be modulated and makes it possible to obtain, by using suitable masks and starting from a layer of Graphene oxide, a resulting layer formed of a plurality of contiguous regions having respective electrical and thermal properties which tend towards those of pure Graphene the further one proceeds with the reduction process in correspondence with non-masked regions.

One of the main methods for reducing graphene oxide provides, as better illustrated below, for a chemical reduction procedure with hydrazine monohydrate. Alternatively, or together with the use of hydrazine, it is also possible to use hydroquinone, sodium boron hydride and vitamin C.

The conductive strips 4a, 4b, to which the conduction terminals of the generator 8 are electrically coupled, extend prolonging the electrical contact regions 7 and therefore may also be realized by reducing a layer of Graphene oxide, and having the same conductive characteristics of the electrical contact regions 7.

It is evident that it is possible to electrically couple together a plurality of transducer elements of the type shown in FIG. 1, forming any type of path (pattern). The connection paths between various transducer elements can be of reduced Graphene oxide (rGO), with resistivity for example between $10^{-7}$ Ωm and $10^{-8}$ Ωm.

Therefore, on the basis of the foregoing, it is evident that the transducer element 4 does not have structural criticalities due to joints between the active region 6 and the contact regions 7, and can therefore be used in applications requiring a high degree of structural strength, such as aeronautical and avionic applications.

Figure 2A:
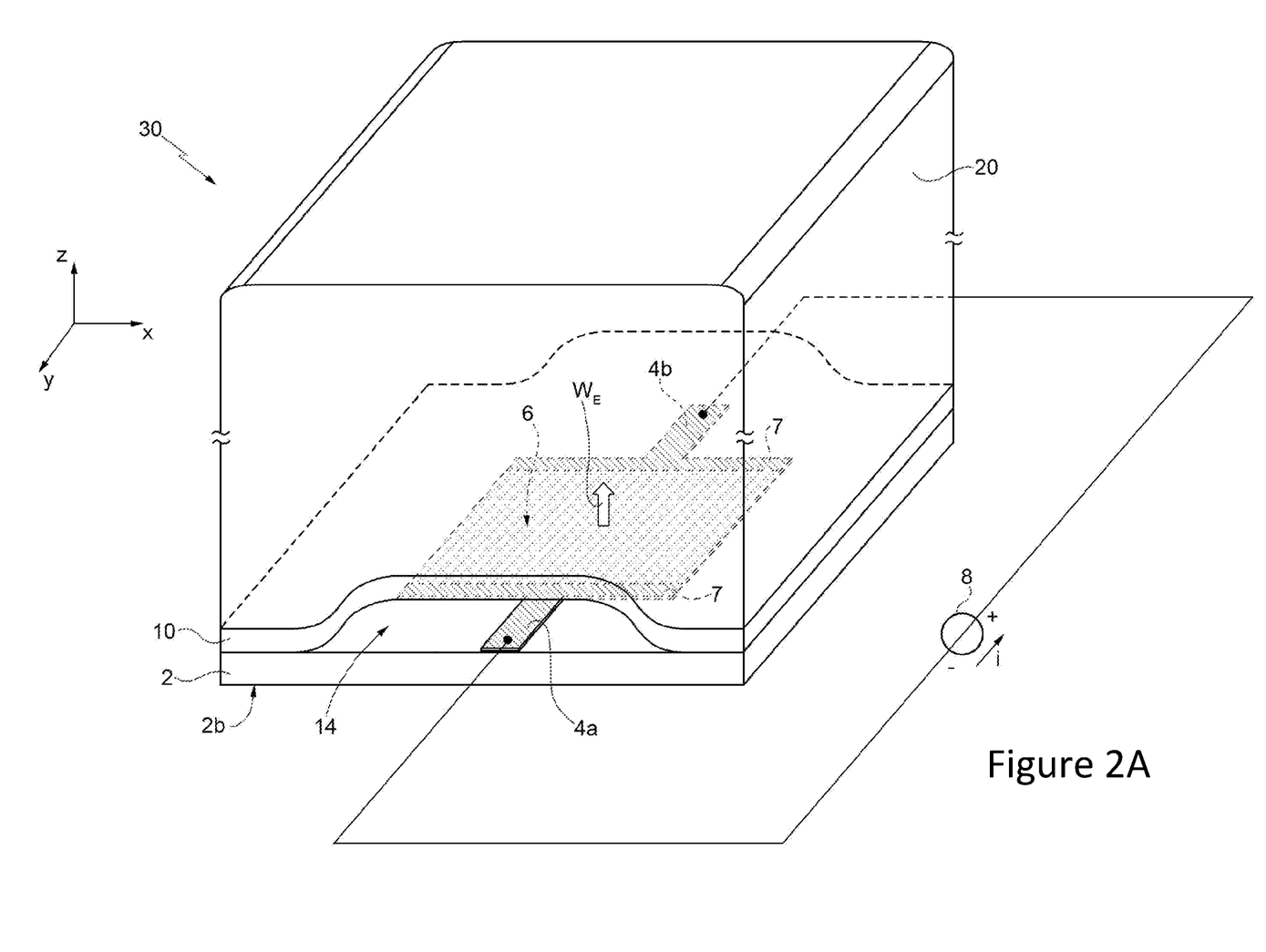
FIG. 2A illustrates the inspection device according to the present invention, coupled to a voltage generator during an operating phase of emitting a transmitted acoustic wave.

FIG. 2A shows the structural portion 1 of FIG. 1 comprising a second structural layer 10 which extends over the first structural layer 2. The second structural layer 10 is coupled to the first surface 2a, in particular in direct contact with it, at surface portions external to the region 3 which houses the transducer element 4. In other words, the coupling between the first and second structural layers 2, 10 is realized in such a way that a coupling region between the first and second structural layers 2, 10 completely surrounds the transducer element 4 without being in direct contact with it. In other words, the second structural layer 10 extends remotely, along the direction Z, from the transducer element 4, thus forming a buried chamber 14, fluidically isolated from the external environment.

In the chamber 14, a gas (e.g., air) is in thermal contact with the transducer element 4. During use, when the electrical signal is applied to the transducer element 4 by the voltage generator 8, a sound wave $W_E$ is generated by thermoelectric effect, whose variation in time is a function of the electric signal applied to the active layer region 6 (i.e., the variation of the electrical signal supplied to the active layer region 6 involves a corresponding variation of the acoustic wave emitted).

The acoustic wave thus generated propagates along the direction Z away from the active layer region 6.

In an embodiment of the present invention, the second structural layer 10 is an integral part of a thick, or "bulk", structural region 20, formed of a plurality of superposed layers of composite material, bonded together by resin, in the manner in itself known (e.g., a structural region in carbon fibre). In this case, the second structural layer 10 and the thick structural region 20 extend seamlessly on each other, i.e. without interruptions or regions of discontinuity. In a different embodiment, an intermediate acoustic coupling layer may be present.

As previously discussed, carbon fibre structures may have manufacturing defects such as delamination, inclusions, porosity, voids and internal wrinkles.

The acoustic wave generated by thermoacoustic effect, propagating along the Z direction away from the active layer region 6 (in the positive direction of the Z axis), can undergo a series of reflections depending on the structural discontinuities present along the Z direction. In other words, the acoustic wave emitted, striking surfaces of regions of discontinuity between materials having different acoustic impedances (due for example to the different density), is reflected with the consequent generation of an acoustic echo wave which is indicative of structural defects in the thick structural region 20 (see FIG. 2B). The detection of such regions of discontinuity is the objective of the non-destructive ultrasound test according to the present disclosure.

Figure 2B:
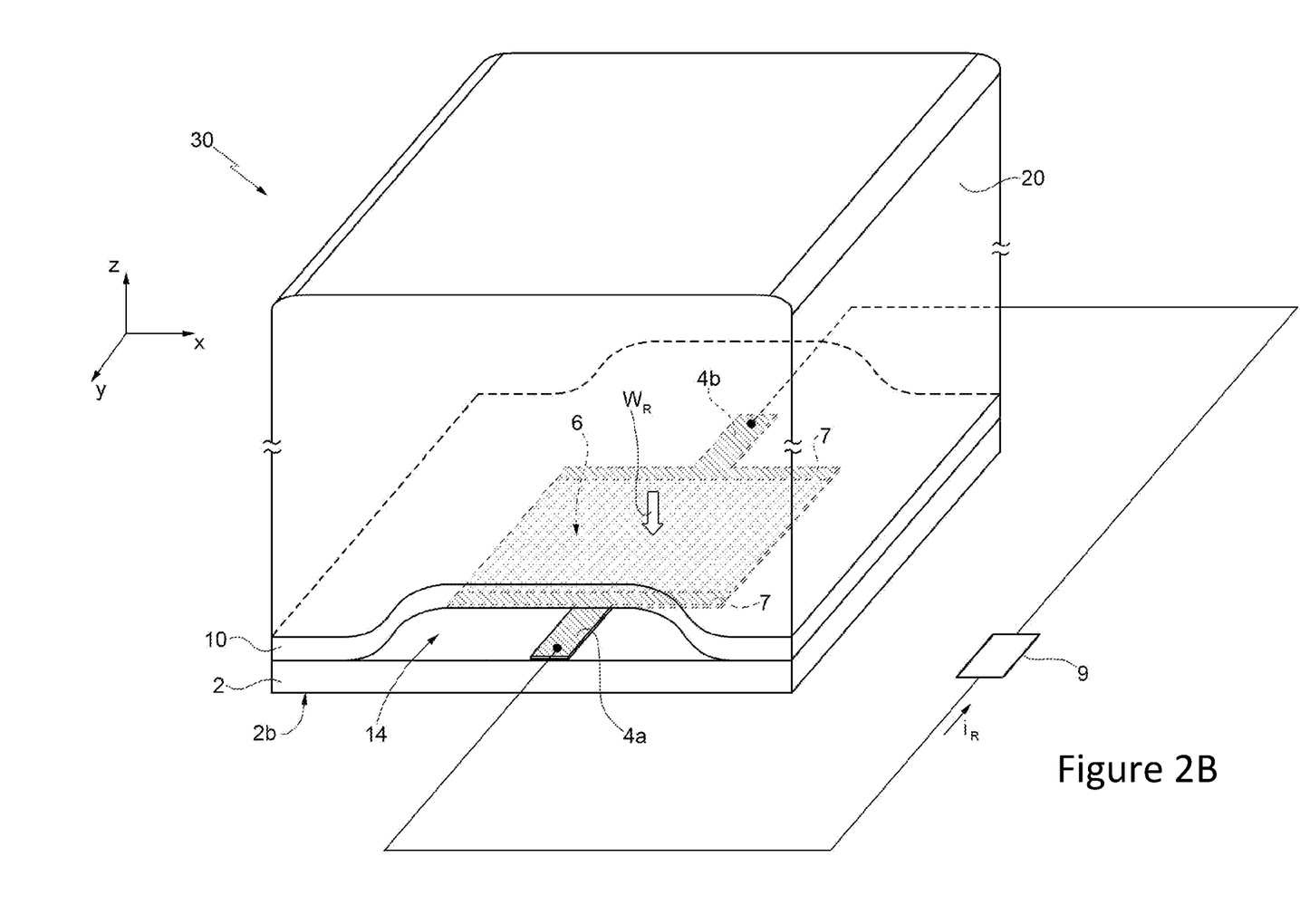
FIG. 2B illustrates the inspection device according to the present invention, coupled to a transducer during an operating phase of receiving a reflected acoustic wave.

A reflected acoustic wave $W_R$ propagates along the direction Z towards the transducer element 4 and in particular towards the chamber 14. The reflected acoustic wave, impacting on the gas molecules present in the chamber 14, generates a pressure variation inside the chamber 14 and, consequently, determines, in the gas, a temperature gradient which is a function of the amplitude of the reflected acoustic wave. The temperature variation of the gas in the chamber 14 causes a heating of the active layer region 6. This heat variation of the active layer region 6 causes the generation of an electric current $i_R$ (or, similarly, a voltage) at the ends of the conductive strips 4a, 4b which is proportional to the amplitude of the reflected acoustic wave and whose variation in time is a function of the variation in time of the reflected acoustic wave. In other words, the electric current $i_R$ induced in the active layer region 6 has a temporal variation that reflects the temporal variation of the reflected acoustic wave.

A current and/or voltage detector 9 (illustrated by way of example in FIG. 2B), of a type in itself known, which can be coupled to the ends of the conductive strips 4a, 4b, makes it possible to detect the electric current $i_R$ (or, similarly, the voltage) induced in the active layer region 6 by the reflected acoustic wave. The current sensor 9, after having detected the electric current $i_R$, generates a signal indicating the electric current $i_R$ (for example, a signal proportional to the electric current $i_R$).

A subsequent analysis of the time variation of the electric current $i_R$ thus detected makes it possible to acquire information relative to the reflected acoustic wave and, consequently, relative to the defect that generated the reflected acoustic wave. Such processing of data is not the subject of the present invention.

The current detector 9 can be made in an integrated form in the structural portion 1 and be part of the device 30 according to the present invention, or it can be an element external to the device according to the present invention.

The first structural layer 2, the transducer element 4, the second structural layer 10, and the chamber 14 (defined between the first structural layer 2 and the second structural layer 10) form, together, the non-destructive inspection device 30.

The phases of emission of the acoustic wave transmitted and of reception of the reflected acoustic wave alternate so that the non-destructive inspection device 30 operates alternatively as emitter of an acoustic wave and as receiver of an acoustic wave, in respective time windows of transmission and reception alternating with each other.

Thus, according to an aspect of the present invention, the transducer element 4, during the emission phase, is supplied with an electric current i of the alternating type (AC current, e.g. sinusoidal or square or pulse wave), and frequency f included in the range of 3.5 MHz to 7 MHz; this way the active layer region 6 is heated and cooled following the same law of variation as the electrical signal i, generating a temperature gradient between the gas molecules in contact (or close) to the active layer region 6 and those further away (along the Z direction) from the active layer region 6. The gas condenses and expands according to the variation defined by the electrical signal i, generating a pressure gradient and thus an acoustic wave in phase with the electrical signal i.

In the receiving phase, the transducer element 4 is not electrically powered, and the reflected acoustic wave penetrates into the gas present in the chamber 14 giving rise to a pressure gradient and thus to a temperature gradient between the molecules of said gas. The active layer region 6 heats up and cools as a function of the variation of the reflected acoustic wave, to which by thermoelectric effect, the generation of an electric current corresponds, making it possible to determine the presence of a defect in the structure and its position. In fact, the time delay between the emission of the acoustic wave and the reception of the corresponding reflected wave is indicative (proportional) of (to) the distance of the defect from the transducer element 4. The amplitude of the reflected wave can be used to provide a measure of the geometric dimension and an indication of the type of defect, estimated by comparing the amplitude of the signal obtained with that of a known reflector used as a reference.

It is preferable for the transducer element 4 to operate in resonance conditions. To such purpose, it is recommended that the descent phase of the electric signal i supplied to the active layer region 6 corresponds to the maximum value of the acoustic wave emitted (maximum expansion of the gas in the chamber 14: gas heating phase), and vice versa (i.e. that the ascent phase of the electric signal i corresponds to the maximum compression of the gas in the chamber 14: gas cooling phase).

Figure 3A:
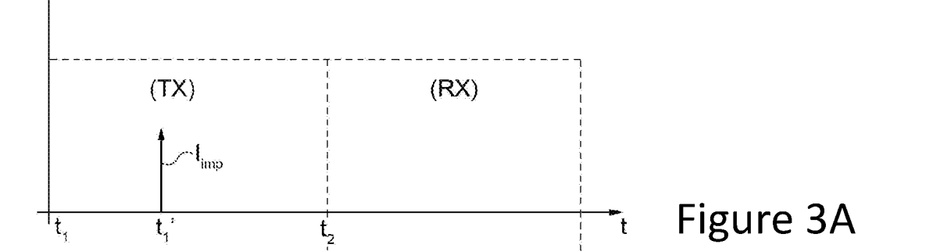

With reference to FIG. 3A, the generation of an electric impulse $I_{imp}$ (electrical signal) is illustrated by way of example in a time interval $t_1$-$t_2$ which defines a time window reserved for the transmission of the acoustic wave, in which the transducer element 4 operates as an emitter. A subsequent time window, between the instants $t_2$ and $t_3$, defines a reception window in which the transducer element 4 operates as a receiver.

Figure 3B:
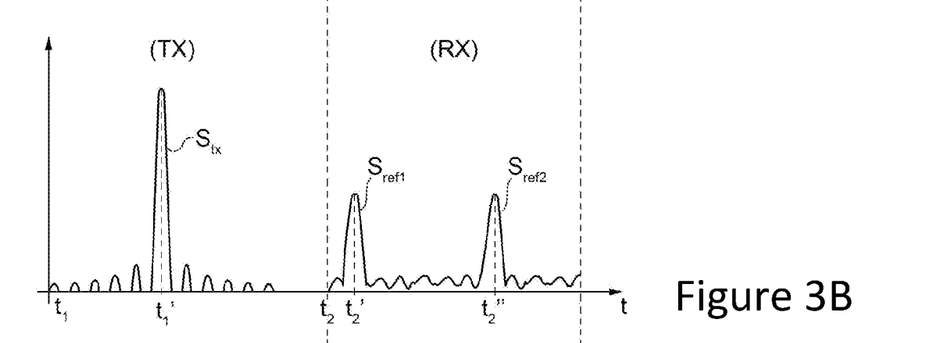
FIG. 3B is representative of a signal received in absence of defect detected and FIG. 3C is representative of a signal received in the presence of detected defect.

With reference to FIG. 3B, in the transmission time window, there is, at time $t_1$, the generation of a transmitted acoustic impulse $S_{tx}$, as previously described. Instead, in the receiving time window, two reflected signals $S_{ref1}$ and $S_{ref2}$ are observed, at the time $t_2'$ and $t_2''$ respectively. The reflected signal $S_{ref1}$ is generated by the interface between the chamber 14 and the second structural layer 10; the reflection $S_{ref2}$ is generated from the bottom surface of the structural region 20. The signals $S_{ref1}$ and $S_{ref2}$ always occur, regardless of the presence of defects. The absence of further reflected signals between the signals $S_{ref1}$ and $S_{ref2}$ is indicative of an absence of defect, or discontinuity, in the portion of the structural region 20 under analysis.

Figure 3C:
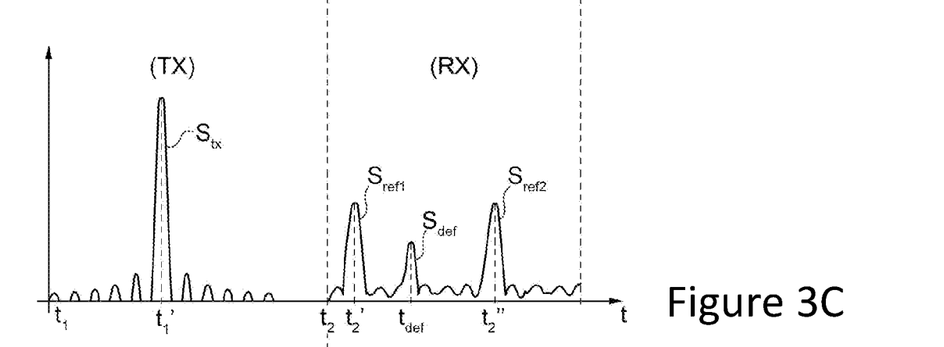

Conversely, with reference to FIG. 3C, the presence of one or more reflected signals $S_{def}$, received in a time interval between $t_2'$ and $t_2''$ (here, at time $t_{def}$), between the $S_{ref1}$ and $S_{ref2}$ signals is indicative of respective one or more defects (or discontinuities) present in the portion of the structural region 20 under analysis.

Figure 3D:
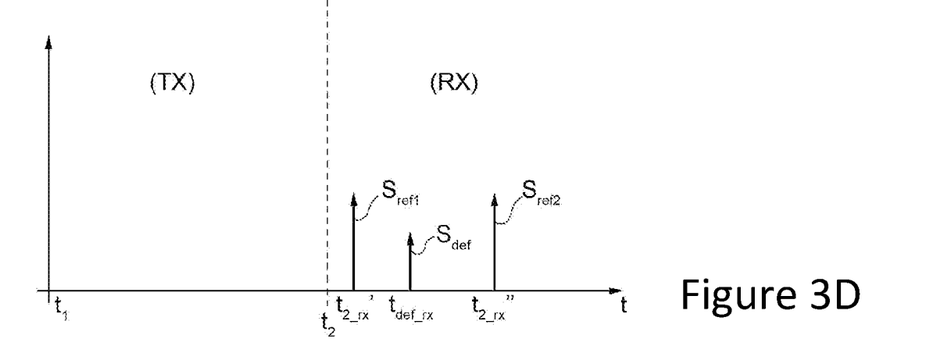

So, in FIG. 3D, the $S_{ref1}$, $S_{ref2}$ and $S_{def}$ signals are converted into respective electrical signals $I_{ref1}$, $I_{ref2}$ and $I_{def}$ (here ideally represented as impulsive signals), acquired respectively at times $t_{2\_rx}'$, $t_{2\_rx}''$ and $t_{def\_rx}$.

The depth $d_{def}$ (along the direction of propagation of the acoustic wave, e.g. along Z) of the defect/discontinuity can be obtained using the formula:

$$d_{def} = V \cdot \Delta t / 2$$

where V is the speed of sound propagation in the material considered and $\Delta t$ is the travel time of the acoustic wave (approximable as the time elapsed between the instant $t_1$ of electrical signal generation $I_{imp}$ and the instant $t_{def\_rx}$ of acquisition of the electric signal $I_{def\_rx}$).

The manufacturing steps of the non-destructive inspection device 30 are illustrated here. Explicit reference will be made to a method for the fabrication of a structural component, in particular of an aircraft, without thereby foregoing its generic nature.

First of all, one or more layers (or sheets) of Graphene oxide are prepared, with a thickness of between 50 μm and 150 μm, for example. The planar extension of a single layer/sheet varies according to the manufacturer and sheets with dimensions from a few centimetres to several meters are generally available. Solutions in liquid form are also available.

Then, a step of gluing said sheets of Graphene oxide onto the first structural layer 2 is carried out. For example, the graphene oxide sheets may be made to adhere to respective portions of the first structural layer 2 by means of an interface layer made from an adhesive or glue or resin. A subsequent heat treatment step permits the solidification of the interface layer and optimization of the adhesion.

Then, a respective mask is formed on the graphene oxide sheets so as to leave bare surface regions of the same at which to reduce the electrical resistivity value, and to generate conductive regions (in particular, the active layer region 6, the electrical contact regions 7, and the conductive strips 4a, 4b, as previously described). The techniques that can be used for the formation of the mask, necessary for the selective processing of surface portions, depend on the size and specific application; for example, known masking processes for chemical milling can be used.

Then, the first structural layer 2 provided with the graphene oxide layer on which the mask extends is placed in a reaction chamber in which hydrazine is fed. Since the reduction of the graphene oxide is greater the longer the hydrazine reaction lasts, by monitoring the reaction time between the hydrazine and the graphene oxide layers (in the non-masked regions) it is possible to interrupt the reduction process when the desired conductive characteristics have been achieved.

For example, using a hydrazine solution with a reaction time of 48 hours, the resistivity of a layer of Graphene oxide of about 10 μm thickness is reduced by three orders of magnitude, from about $10^{12}$ Ωm to $10^9$ Ωm. The Applicant has verified that a reduction process of graphene oxide with hydrazine carried out for a time equal to 48 hours is able to modify the electrical characteristics of the layer which from a perfect insulator (characteristic VI constant with V in the range [−5V; +5V], and I<1 pA) becomes an ohmic material (characteristic VI linear with V in the range [−5V; +5V], I in the range [−6 nA; +6 nA]). This aspect is particularly important for the purposes according to the present invention, since it proves that the reduction of resistivity a Graphene oxide layer is a function of the hydrazine exposure time (increasing the exposure time reduces the resistivity). It is thus possible to first adjust the resistivity value of the electrical contact regions 7 to the desired value.

Then, a masking step is performed of the newly formed electrical contact regions 7, leaving the reduced graphene oxide portions, in which the active layer region 6 is to be formed, exposed. By performing a new reduction process, it is possible to further reduce the resistivity of the exposed regions, reaching the desired value (depending on the desired HCPUA value).

Lastly, the first structural layer 2, provided with the reduced graphene oxide sheets, is removed from the reaction chamber and the masks present are removed. The transducer element 4 is thus obtained.

For the creation of the chamber 14, it is possible to proceed in various ways.

In a first embodiment, it is possible to generate local depressions of the second structural layer 10 by techniques which provide for the formation of air bubbles by creating cavities between two successive sheets by a pressure shaping between the two successive layers and/or by local insertion of a separating material which prevents the complete adhesion and compacting of the layers. Then, the first structural layer 2 is laid on the second structural layer 10, so that the transducer element 4 (and in particular the active layer region 2) is directly facing the depression made in the second layer structural 10.

In a second embodiment, a thin layer ("film") of highly reflective ultrasonic material (e.g., 1 cm×1 cm in size) inside a transparent, semi-permanent epoxy separation material, for composite materials and polyester resins, solvent-based, which polymerises with moisture (also known as "Frerotte"), and placing the pile thus formed between two successive layers of layers of composite material (e.g., carbon fibre) or, in the context of the present invention, between the structural layer 2 and the structural layer 10.

During a polymerization phase (e.g. in an autoclave), the structure thus formed undergoing specific pressure (between 1 bar and 6 bar) and temperature conditions (between 0 and 180° C.), the creation of a cushioning layer of gas is facilitated due to the evaporation of the separation material and consequent localised detachment between the structural layer 2 and the structural layer 10. The chamber 14 is thus formed.

According to an aspect of the present invention, the chamber 14 has a volume approximable to a cylindrical or truncated cone shape defined by lower and upper surfaces of an area comprised between 1 cm$^2$ and 100 cm$^2$ and a height between 0.1 mm and 10 mm. These dimensions are functions of the surface and of the thickness of the part or structure to be inspected, in general they are determined considering values of at least 2 orders of magnitude smaller.

It is evident that it is possible to use other materials which, when subjected to a thermal process, evaporate causing the formation of a pocket of buried gas which forms the chamber 14.

The structural component considered, provided with one or more non-destructive inspection devices manufactured as described above, can then be subjected to the remaining manufacturing steps, such as for example painting on the second surface 1b of the first structural layer 2.

As previously mentioned, alternatively to the use of hydrazine, or in addition to it, sodium boron hydride NaBH$_4$ can be used for the reduction of the graphene oxide. Other reducing agents used are, for example, gaseous hydrogen, hydroquinones and strong alkaline solutions.

Other known methods for the reduction of Graphene oxide include high temperature heat treatment (typically, about 1000° C.); however, a heat treatment at such high temperatures could compromise the structural solidity of the components which the oxide layer has been glued to, as well as the functionality of the adhesive or glue interface layer.

According to a different embodiment of the present invention, it is possible to perform a negative process, i.e. a process in which unmasked areas of graphene sheets are oxidized to bring them into an electrical insulating condition. In this case, the process starts from sheets of graphene (an excellent electrical conductor) which are coupled to the avionic structure to form respective layers of Graphene. Then, a partial oxidation of such layers of Graphene is carried out (masking the active layer regions 6) until a desired electrical resistivity value is obtained for the electrical contact regions 7 and for the conductive strips 4a, 4b, forming controlled resistivity regions of partially oxidized Graphene (also known as poG). Oxidation is carried out by bathing in an aqueous solution rich in oxidizing agents.

Thus, according to an embodiment of the present invention, the first structural layer 2 is the outermost layer (or one of the outermost layers) of a structural component of an aircraft, such as a fuselage portion or a wing portion, or other, made of composite material. The second structural layer 10, together with the thick structural region 20 belong, instead to the remaining part of the structural component of the aircraft, and substantially define the thickness of the structural component considered. In other words, any defects not detectable by visual inspection extend exclusively in the thick structural region 20. By forming a plurality of transducer elements 4, each provided with its own chamber 14, facing towards the thick structural region 20 (i.e., suitable to emit respective acoustic waves towards the thickness of the thick structural region 20), it is possible to verify, both during the phases of testing and assembly and during the entire operating life of the aircraft, the presence of pre-existing or newly generated defects, thus adding considerably to the relative structural safety.

Figure 4:
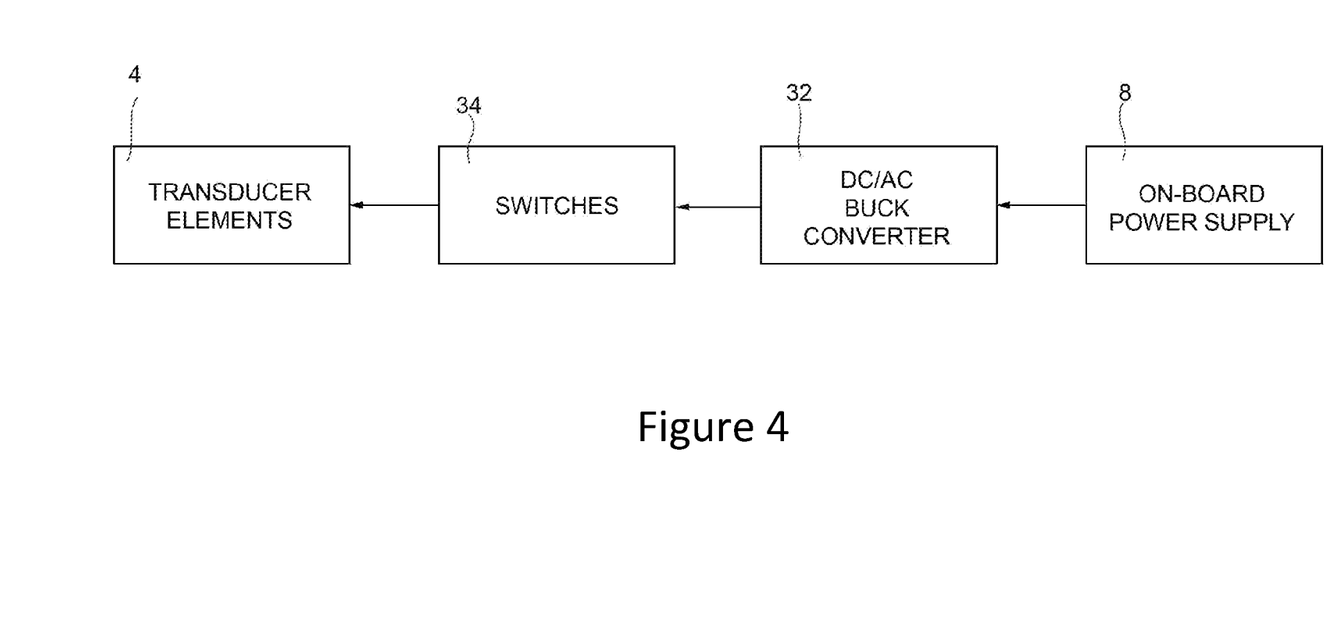
FIG. 4 illustrates a system including a plurality of inspection devices according to the present invention.

With reference to FIG. 4, a plurality of transducer elements 4 are functionally connected to conduction terminals of the voltage generator 8 (or of respective voltage generators) configured to cause, in use, the flow of respective electric current i through the active layer region 6 of each transducer element 4. Although the transducer elements 4 can be powered simultaneously, in order to prevent cross-talk phenomena, it is preferable to power transducer elements 4 close to each other (for example, the transducer elements 4 which extend at a distance, one from the other, of about $^1/_{10}$ of the size of the active layer), at different time intervals. The aforementioned distance value equal to $^1/_{10}$ is chosen to guarantee electrical insulation between adjacent elements and simultaneously to inspect the underlying layer, the interspace surface between the two elements, exploiting the lateral propagation effect of the acoustic power of the two transmitters/receivers. To such purpose, it is possible to connect each transducer element 4 to the voltage generator 8 by means of respective switches 34 (row and column selectors, in the case of a matrix organization of the transducer elements 4), selectively controllable so as to couple and decouple each transducer element 4 to the voltage generator 8, at different instants in time with respect to other transducer elements 4.

The transducer elements 4 may extend to form a matrix, or grid, or curvilinear, or spoke patterns, or others yet, as needed.

Regardless of the number of transducer elements 4 integrated into the structure considered, the voltage generator 8 is configured to polarise each active layer region 6 at working voltages, e.g. between −0.5 V and +0.5 V, generating a power that falls in the range −10 dB and −50 dB to allow the inspection of a structure with a thickness of the order of 1 cm up to 5 cm.

For example, in the case of avionics applications, the on-board power supply is used, typically of a variable value in the range between 24 V and 48 V in direct current (DC). In this case, it is advisable to have a DC-AC converter of the reduction, or "buck" type 32, between the voltage generator 8 and the transducer elements 4. The choice of the voltage value supplied to the transducer elements 4 is, specifically, a function of the thickness of the active layer region 6 and of the resistivity of the active layer region 6, as well as, as said, of the thickness of the avionic part or structure to be inspected. As a result, transducer elements 4 arranged at different portions of the same aircraft could be supplied with voltages/currents of different values, according to local conditions.

From what has been described, it is evident that the present invention represents a significant evolution with respect to what is reported in the literature and known in the prior art.

The graphene oxide layer, which is selectively reduced at specific portions thereof, has characteristics of lightness, strength, flexibility and reliability, with controlled electrical conductivity. The same advantages are conferred by the use of a dual layer of pure graphene subsequently oxidized. Graphene sheets with a thickness of a few tens of micrometres, as well as its derivatives (prGO, poG), are extremely resistant and have excellent elastic and flexible properties, and do not impact the thickness or structural solidity of the structure which they are integrated in. It is therefore ideal for the construction of non-destructive test instruments in the aeronautic field.

Moreover, the integration achievable according to the present invention makes it possible to perform non-destructive structural tests during the entire working life of the aircraft which can be performed not only in the laboratory during the manufacture of the parts, but also after the assembly of the aircraft and for parts whose surface is not accessible from the outside since the instrumentation probes are integrated on the surface of the individual parts making up the aircraft. The present invention also offers advantages of reliability (high fidelity probes), compactness and low cost.

Lastly, it is clear that modifications and variants may be made to the invention described and illustrated herein while remaining within the protective scope of the present invention, as defined by the appended claims.

The non-destructive inspection device 30 previously described can be formed on a structural element different from a layer of composite material. For example, the layer 2 and layer 10 may be made of metal (e.g. aluminium), or semiconductor material (e.g., silicon).

Moreover, the non-destructive inspection device 30, having a chamber 14 defined between the two structural layers 2, 10 and housing the transducer element 4, can be used in different fields from those previously discussed in detail. For example, it may not be integrated into a vehicle structure or avionic structure, but be used in ocean probes, in devices for the ultrasound detection of hazardous material (e.g. for the detection of mines), for sonar systems or for the realization of biomedical instrumentation.

To summarize, the present disclosure describes a manufacturing method of a non-destructive inspection device, and the device itself, for the application of non-destructive ultrasound tests on composite materials used in aeronautics. Important aspects of the device concern, in a non-limiting embodiment, the presence of a network of micro probes integrated in the structure of the composite material to be analysed. A matrix of acoustic micro probes integrated in the material, makes it possible to overcome all the limitations of the prior art, also guaranteeing: better performance in resolution, smaller probes and therefore ability to detect smaller defects; better performance in terms of time and costs, no expert operator is required and the test time does not depend on the surface; the processing of the signals acquired by the micro probes takes place in parallel and not in sequence, as in the case of external probes according to the prior art; it is possible to extend the tests also to post-assembly phases, even if the surface is not accessible from the outside. Furthermore, the weight of the structure to be inspected is not increased significantly.

As regards the manufacturing process, the proposed solution provides for the manufacturing of the inspection device at the same time as the manufacture (autoclave, bonding, laying of carbon fibres, etc.) of the composite material (carbon ply multilayer) used as raw material for the aeronautical structures. The steps needed for the construction of the inspection device are a certain combination of the processing methods of the Graphene (reduction/oxidation) combined with some aeronautical processes (masking, bonding) and characteristic of the silicon electronics (selective doping of portions of layer of the same material to create conductive, insulating and resistive sections).

The requirements for use in aeronautical structures are guaranteed, in particular: homogeneity of the structure for safety requirements related to compactness and robustness; the conductive layer, the insulating layer and the sensor layer are all made Graphene hybrids (the limits of the prior art which required the use of non-homogeneous metals and oxides, which cannot be integrated are thus overcome); homogeneity of the structure for detection resolution requirements, limiting the generation of false positives; fabrication contextual to the processing of the composite material of the structure to be inspected (the probe cannot be inserted after the construction of the material).

As for the non-destructive inspection procedure, it is to be noted that the non-destructive test is not necessarily carried out in the laboratory, but can also be performed on a built aircraft, and is therefore also extendable to the periodic revision and testing of aircraft; the test can also be performed with an aircraft in flight, for an online diagnosis; the test is performed without the aid of a certified operator, so that it is not affected by possible human errors; the test is performed with a significant reduction in time and costs, because the execution is automatic and takes place with a matrix of probes with parallel processing; the test can also be performed on non-flat surfaces without the aid of additional interfaces; the test is more reliable since algorithms for filtering false positives due to second trace echoes can be used.

The invention claimed is:

1. A non-destructive inspection device (30) for detecting flaws in a body in composite material (20), comprising:
  a first structural layer (2), having a first and a second surface (2a, 2b) opposite each other;
  a second structural layer (10) mechanically coupled to the first surface (2a) of the first structural layer (2);
  a sealed chamber (14), extending between the first and the second structural layer, containing a gas; and
  an active region (6), housed in the chamber (14), having a first and a second conduction terminal (7, 4a, 4b), and being made of one of the following materials: partially reduced graphene oxide, reduced graphene oxide, graphene,
  wherein said first and second conduction terminals (7, 4a, 4b) can be polarized, in a first operating condition, by an AC electric current so as to cause a thermoacoustic generation, by the active region (6), of a first acoustic wave ($W_E$) propagating away from the chamber (14);
  wherein said chamber (14) is configured to receive, in a second operating condition, a second acoustic wave generated by a reflection of the first acoustic wave;
  wherein said active region (6) is configured to generate, in the second operating condition and by a thermoelectric effect, an electrical signal ($i_R$) between the first and second conduction terminals of the active region (6);

wherein the second structural layer (10) is an integral part of said body (20), the body being formed by a plurality of superposed layers of composite material bonded together by resin;

and wherein both the first and the second structural layers (2, 10) are made of the same composite material as said body (20).

2. The device according to claim 1, wherein the second structural layer (10) is mechanically coupled to said body made of composite material (20), wherein, said chamber (14) and said active region (6) are mutually arranged in such a way that, in the first operating condition, the first acoustic wave propagates towards the body in composite material (20), and wherein, in the second operating condition, the second acoustic wave, generated by the reflection of the first acoustic wave in the presence of a defect in the body in composite material (20), is received by said chamber (14);

and wherein said chamber (14) and said active region (6) are mutually arranged in such a way that a pressure variation and, consequently, a temperature variation, in the gas contained in the chamber (14) generates, due to the thermoelectric effect, said electrical signal (ix) indicative of the presence of said defect.

3. The device according to claim 2, wherein said composite material includes carbon fibre in a resin matrix.

4. The device according to claim 1, wherein said active region (6) has a heat capacity per unit area, HCPUA, ranging from $10^{-1}$ and $10^{-2}$ J m$^{-2}$ K$^{-1}$.

5. The device according to claim 1, wherein the gas present in the chamber (14) is air or a noble gas.

6. The device according to claim 1, wherein the first and the second conduction terminals (7, 4a, 4b) are made of partially reduced graphene oxide.

7. The device according to claim 1, wherein the active region (6) and the first and the second conduction terminal (7, 4a, 4b) extend, without interruption, in the same layer of partially reduced graphene oxide, and wherein an electric resistivity value of the active region (6) is lower than an electric resistivity value of the first and the second conduction terminals (7, 4a, 4b).

8. The device according to claim 1, wherein the chamber (14) defines a volume having a base surface ranging from 1 cm$^2$ to 100 cm$^2$ and a height ranging from 0.1 mm to 10 mm.

9. The device according to claim 1, wherein the chamber (14) is delimited internally by the respective surfaces of the first layer (2) and the second layer (10), said active region (6) extending on the first surface (2a) of the first layer (2) at a distance from the respective surface of the second layer (10).

10. The device as claimed in claim 1, comprising:

a voltage generator (8) coupled to the first and second conduction terminals of the active region (6), operable to generate, in the first operating condition, an AC electric current between the first and second conduction terminals of the active region (6) so as to produce, by means of the thermoacoustic effect, said first acoustic wave ($W_E$); and a current detector (9) coupled to the first and second conduction terminals of the active region (6), configured to detect, in the second operating condition, temporally following the first operating condition, said electrical signal ($i_R$) between the first and second conduction terminals of the active region (6) and to generate and output a signal proportional to said electrical signal ($i_R$).

11. An avionic structure provided with the body (20) in composite material, integrating the non-destructive inspection device (30) according to claim 1, wherein the second structural layer (10) of the non-destructive inspection device (30) is mechanically coupled to said body in composite material (20).

12. The avionic structure according to claim 11, wherein the second structural layer (10) and the body (20) extend one on the other without interruptions or regions of discontinuity.

13. The structure according to claim 11, selected from the group comprising: wing structure, fuselage, fin, rudder.

14. A means of transport comprising a structure according to claim 11.

15. The means of transport according to claim 14, selected from the group comprising: an aircraft, a helicopter, an unmanned aerial vehicle or UAV, terrestrial vehicles, naval vessels.

16. A method of manufacturing a non-destructive inspection device (30) for detecting flaws in a body in composite material (20), comprising the steps of:

arranging a first structural layer (2), having a first and a second surface (2a, 2b) opposite each other;

forming an active region (6) on the first surface (2a) of the first structural layer (2), the active region (6) having a first and a second conduction terminal (7, 4a, 4b), and being made of one of the following materials: partially reduced graphene oxide, reduced graphene oxide, graphene;

mechanically coupling a second structural layer (10) to the first surface (2a) of the first layer (2) so as to form a sealed chamber (14), containing a gas, between the first and the second structural layer in an area of said active region (6);

wherein the second structural layer (10) is formed an integral part of said body (20), the body being formed by a plurality of superposed layers of composite material bonded together by resin;

and wherein both the first and the second structural layers (2, 10) are made of the same composite material as said body (20).

17. The manufacturing method according to claim 16, further comprising the step of mechanically coupling the second structural layer (10) to said body made of composite material (20) to be inspected.

18. The manufacturing method according to claim 17, wherein said composite material includes carbon fibre in a resin matrix.

19. The manufacturing method according to claim 16, wherein said active region (6) has a heat capacity per unit area, HCPUA, ranging from $10^{-1}$ to $10^{-2}$ J m$^{-2}$ K$^{-1}$.

20. The manufacturing method according to claim 16, wherein the gas present in the chamber (14) is air or a noble gas.

21. The manufacturing method according to claim 16, wherein the step of forming the chamber (14) comprises forming locally an evaporating layer between the first and the second structural layer; and carrying out a heat treatment which causes evaporation of the evaporating layer, thus forming a buried region of gas which defines said chamber (14).

22. The manufacturing method according to claim 16, wherein the step of forming the chamber (14) comprises forming a depression in a selective region of the second structural layer (10) prior to the step of coupling the second structural layer (10) to the first surface (2*a*) of the first layer (2).

23. The manufacturing method according to claim 16, wherein forming the active region (6) includes:
   carrying out a first operation for reducing a layer of graphene oxide, forming partially reduced graphene oxide in selective regions of the layer of graphene oxide in which formation of the active region (6) and the first and the second conduction terminal (7, 4*a*, 4*b*) is desired; and
   carrying out a second reduction operation in selective regions of the layer of graphene oxide in which formation exclusively of the active region (6) is desired, so that an electric resistivity value of the active region (6) is lower than an electric resistivity value of the first and second conduction terminals (7, 4*a*, 4*b*).

24. A non-destructive inspection method, comprising the steps of:
   generating by the thermoacoustic effect, in a first operating condition, by means of the non-destructive inspection device (30) according to claim 1, a first acoustic wave propagating away from the non-destructive inspection device (30);
   receiving, in a second operating condition, by means of the non-destructive inspection device (30) according to claim 1, a second acoustic wave generated by reflection of the first acoustic wave; and
   generating, by thermoelectric effect, by means of the non-destructive inspection device (30) according to claim 1, an electric signal indicative of the second acoustic wave.

25. The method of operation according to claim 24, wherein the step of generating the first acoustic wave includes supplying an AC electric current between the first and the second conduction terminal of the active region (6) of the non-destructive inspection device (30),
   and wherein the step of generating an electric signal indicative of the second acoustic wave includes causing a pressure variation and, consequently, a temperature variation, of the gas contained in the chamber (14) of the non-destructive inspection device (30).

* * * * *